US009989721B2

(12) United States Patent
Barwicz et al.

(10) Patent No.: US 9,989,721 B2
(45) Date of Patent: Jun. 5, 2018

(54) CONNECTING MID-BOARD OPTICAL MODULES

(71) Applicant: International Business Machines Corporation, Armonk, NY (US)

(72) Inventors: Tymon Barwicz, Yorktown Heights, NY (US); Edward Lindsey Kimbrell, Dacula, GA (US); Theodore William Lichoulas, Simpsonville, SC (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/491,106

(22) Filed: Apr. 19, 2017

(65) Prior Publication Data

US 2017/0219789 A1 Aug. 3, 2017

Related U.S. Application Data

(63) Continuation of application No. 15/234,057, filed on Aug. 11, 2016, now Pat. No. 9,696,497, which is a
(Continued)

(51) Int. Cl.
*G02B 6/255* (2006.01)
*G02B 6/42* (2006.01)
*G02B 6/38* (2006.01)

(52) U.S. Cl.
CPC ......... *G02B 6/4292* (2013.01); *G02B 6/3825* (2013.01); *G02B 6/3878* (2013.01);
(Continued)

(58) Field of Classification Search
CPC ...... G02B 6/30; G02B 6/3874; G02B 6/4261; G02B 6/4267; G02B 6/3825;
(Continued)

(56) References Cited

U.S. PATENT DOCUMENTS 3,789,950 A 2/1974 Strenglein
4,406,514 A 9/1983 Hillegonds et al.
(Continued)

FOREIGN PATENT DOCUMENTS

CN 1225663 11/2005
CN 103439771 4/2015

OTHER PUBLICATIONS

List of IBM Patents or Patent Applications Treated as Related.
(Continued)

*Primary Examiner* — Thomas A Hollweg
*Assistant Examiner* — Guy Anderson
(74) *Attorney, Agent, or Firm* — Fleit Gibbons Gutman Bongini Bianco PL; Gary Winer

(57) ABSTRACT

A system for connecting a fiber optic cable to a laminate has a clip which attaches to a cover on the circuit board. The clip supports ferrules which are connected to a photonic device on the board. The clip has a backplane which supports retainers which hold the ferrules. The clip also has mating attachments for connecting to the cover. The cover additionally serves as a heat dissipator, which can include heat from the photonic device. An adapter is connected to the cover and receives the ferrules supported by the clip. The adapter connects to a standard connector, such as an LC connector. The adapter can be positioned at the edge of the laminate, or can be attached at an angle extending from an interior region of a circuit board to which the laminate is mounted.

20 Claims, 6 Drawing Sheets

Related U.S. Application Data continuation of application No. 14/982,716, filed on Dec. 29, 2015, now Pat. No. 9,482,820.

(52) U.S. Cl.
CPC ......... *G02B 6/3879* (2013.01); *G02B 6/3897* (2013.01); *G02B 6/4239* (2013.01); *G02B 6/4242* (2013.01); *G02B 6/4272* (2013.01)

(58) Field of Classification Search
CPC .. G02B 6/3878; G02B 6/3879; G02B 6/3897; G02B 6/4239; G02B 6/4242; G02B 6/4272
USPC .............................. 385/14–15, 53, 88–89, 92
See application file for complete search history.

(56) References Cited

U.S. PATENT DOCUMENTS

| | | | |
|---|---|---|---|
| 4,787,706 A * | 11/1988 | Cannon, Jr. .......... | G02B 6/3831 385/24 |
| 5,219,297 A | 6/1993 | Stein et al. | |
| 5,245,683 A * | 9/1993 | Belenkiy .............. | G02B 6/3849 385/69 |
| 5,796,896 A * | 8/1998 | Lee ....................... | G02B 6/3825 385/59 |
| 6,186,670 B1 | 2/2001 | Austin et al. | |
| 6,315,590 B1 * | 11/2001 | Grois ................... | G02B 6/3893 439/248 |
| 6,331,079 B1 | 12/2001 | Grois et al. | |
| 6,434,316 B1 | 8/2002 | Grois et al. | |
| 6,712,527 B1 | 3/2004 | Chan et al. | |
| 7,142,748 B1 * | 11/2006 | Yang ..................... | G02B 6/30 385/14 |
| 7,149,400 B2 | 12/2006 | Lange et al. | |
| 7,331,717 B2 | 2/2008 | Kiani et al. | |
| 7,347,634 B2 | 3/2008 | Gunther et al. | |
| 7,802,926 B2 * | 9/2010 | Leeman ............... | G02B 6/3825 385/137 |
| 8,083,547 B2 | 12/2011 | Roth et al. | |
| 8,338,713 B2 | 12/2012 | Fjelstad et al. | |
| 8,827,568 B1 | 9/2014 | Isenhour et al. | |
| 8,867,869 B2 | 10/2014 | Steijer et al. | |
| 9,195,014 B2 | 11/2015 | Moriyama et al. | |
| 2002/0114589 A1 * | 8/2002 | Igl ....................... | G02B 6/4261 385/88 |
| 2003/0190123 A1 | 10/2003 | Kahle et al. | |
| 2004/0008494 A1 * | 1/2004 | Roth .................... | G02B 6/3887 361/736 |
| 2004/0013388 A1 * | 1/2004 | Fujiwara .............. | G02B 6/3893 385/134 |
| 2004/0067027 A1 * | 4/2004 | Plotts ................... | G02B 6/3897 385/75 |
| 2004/0156595 A1 * | 8/2004 | Stockhaus ............ | G02B 6/4292 385/88 |
| 2006/0002659 A1 | 1/2006 | Kiani et al. | |
| 2008/0166090 A1 | 7/2008 | Kiani et al. | |
| 2010/0081303 A1 | 4/2010 | Roth et al. | |
| 2010/0202736 A1 * | 8/2010 | Roth .................... | G02B 6/3823 385/59 |
| 2010/0260457 A1 * | 10/2010 | Watanabe ............ | G02B 6/3897 385/92 |
| 2011/0081113 A1 | 4/2011 | Jones | |
| 2011/0217009 A1 | 9/2011 | Burrell et al. | |
| 2014/0178009 A1 * | 6/2014 | Ko ......................... | G02B 6/36 385/77 |
| 2014/0241689 A1 | 8/2014 | Bradley et al. | |
| 2014/0270652 A1 | 9/2014 | Barwicz et al. | |
| 2015/0003787 A1 | 1/2015 | Chen et al. | |
| 2015/0003790 A1 | 1/2015 | Wu et al. | |
| 2015/0030287 A1 | 1/2015 | Huang | |
| 2015/0036980 A1 | 2/2015 | Li et al. | |
| 2015/0093077 A1 | 4/2015 | Huang | |
| 2015/0338585 A1 * | 11/2015 | Li ......................... | G02B 6/423 385/31 |
| 2016/0004021 A1 * | 1/2016 | Pelletier ............... | G02B 6/4292 385/14 |
| 2016/0091679 A1 | 3/2016 | Chou et al. | |
| 2016/0231513 A1 * | 8/2016 | Butler .................. | G02B 6/421 |
| 2016/0282575 A1 * | 9/2016 | Annis ................... | G02B 6/4249 |

OTHER PUBLICATIONS

Wikipedia, "Optical fiber connector", https://en.wikipedia.org/wiki/Optical_fiber_connector, last visited on Dec. 28, 2015, pp. 1-11.

Notice of Allowance dated Jul. 15, 2016, received for U.S. Appl. No. 14/982,716.

Notice of Allowance dated Feb. 21, 2017, received for U.S. Appl. No. 15/234,057.

Non-Final Office Action dated Oct. 12, 2016, received for U.S. Appl. No. 15/234,057.

Google Search conducted by Examiner for "fiber optic cable clip with backplane ferrule retainers cover with heat conductive conducting with photonic device" on Jul. 15, 2016, for U.S. Appl. No. 14/982,716.

Pitwon, et al., "Pluggable Electro-Optical Circuit Board Interconnect Based on Embedded Graded-Index Planar Glass Waveguides", Journal of Lightwave Technology, Feb. 15, 2015, vol. 33, No. 4, Provided by Examiner on Jul. 15, 2016, for U.S. Appl. No. 14/982,716.

* cited by examiner

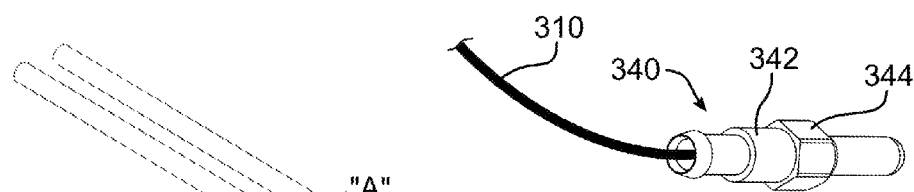
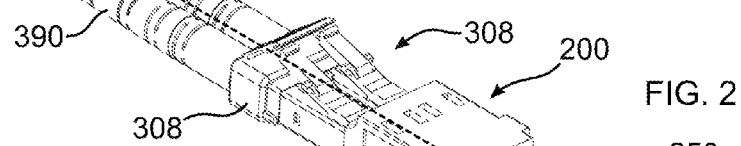
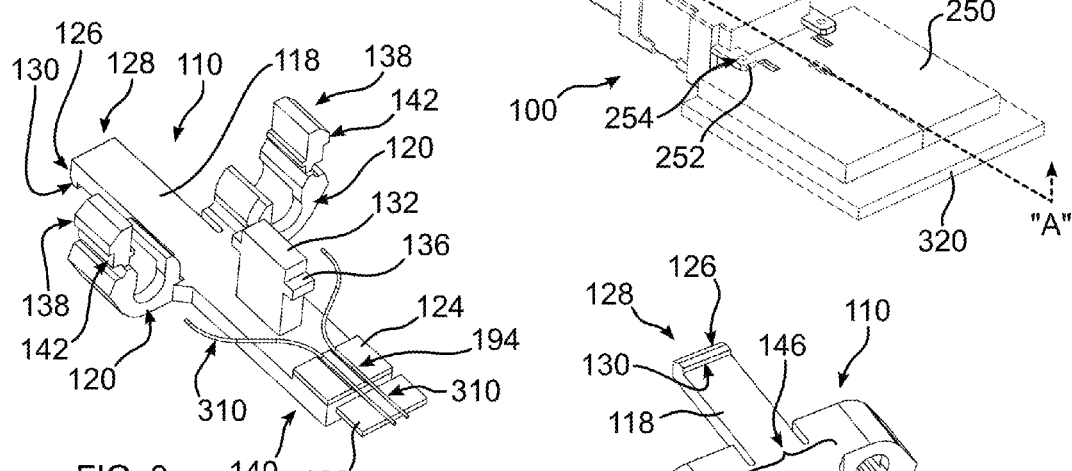
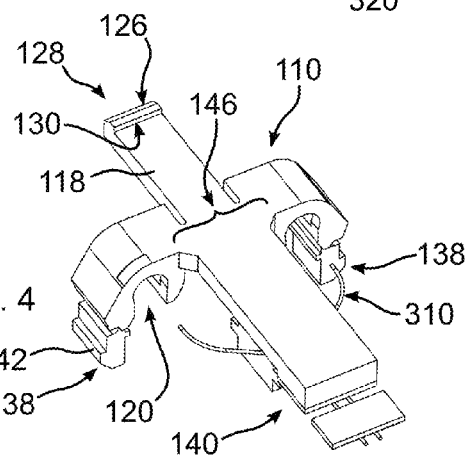
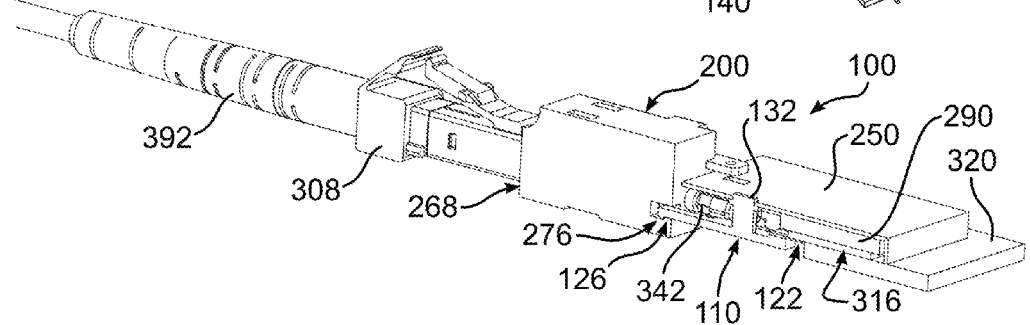

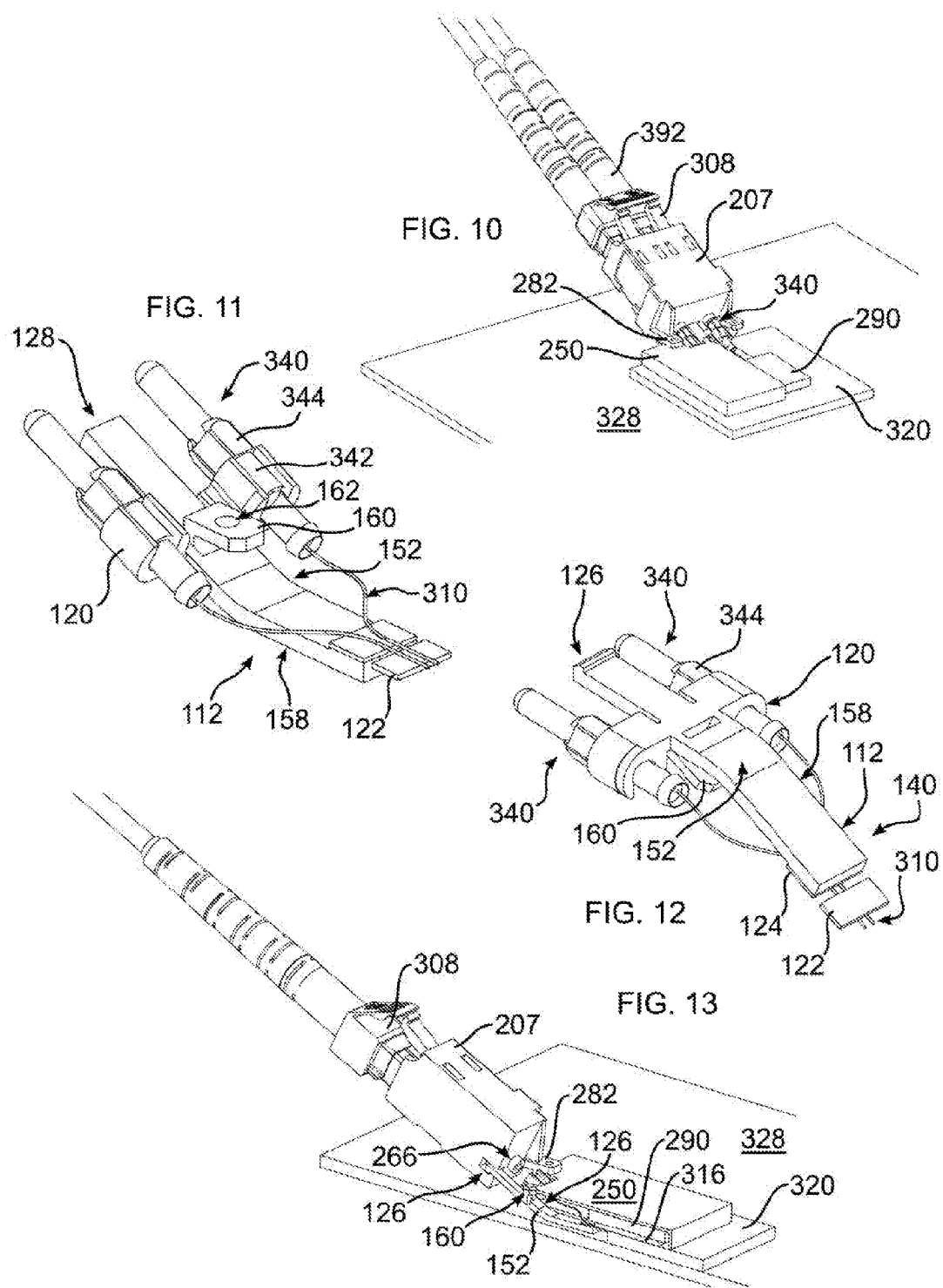

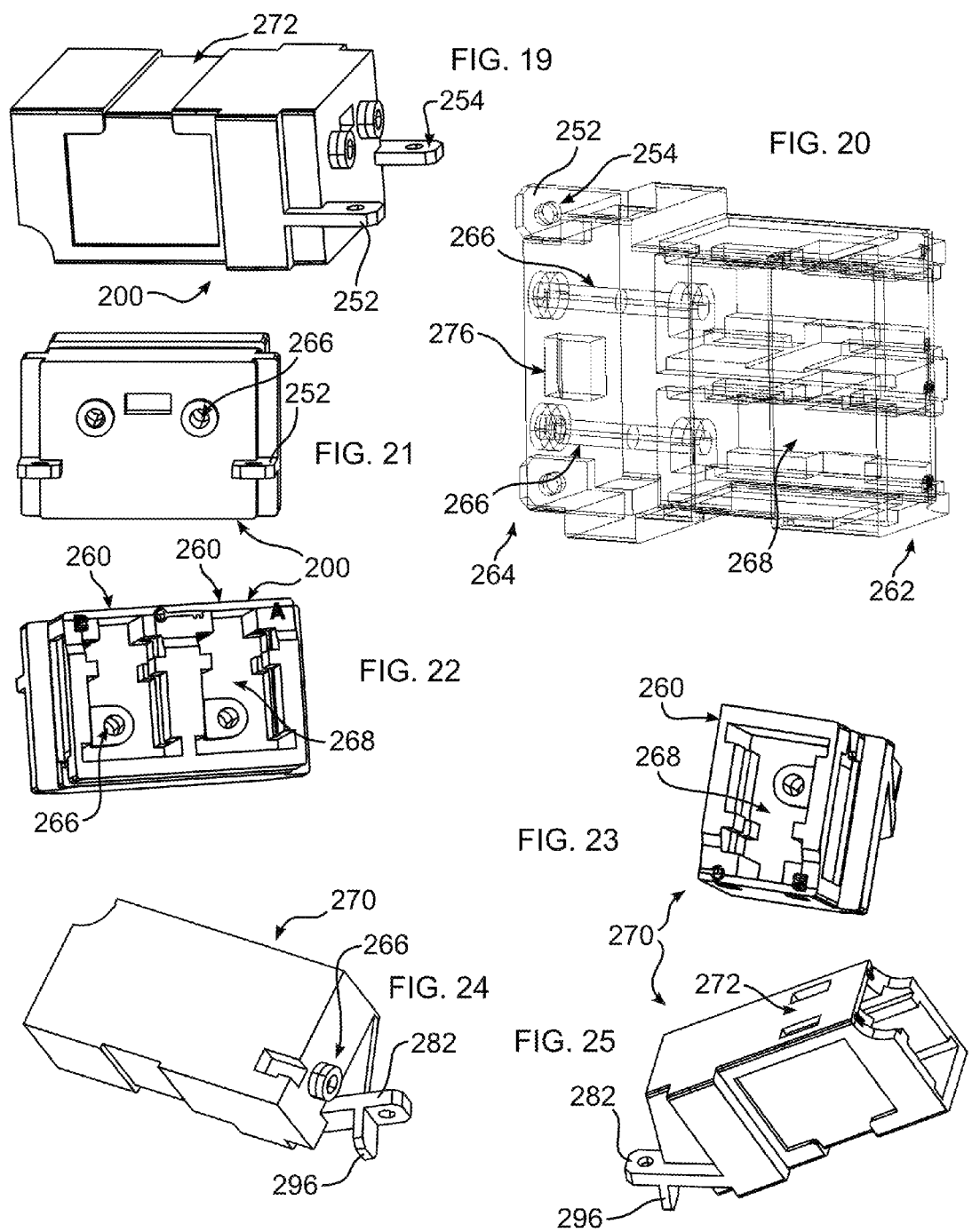

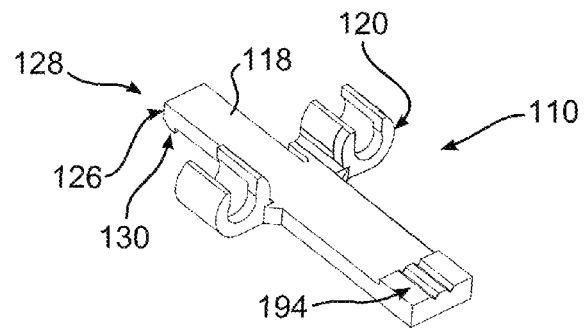
FIG. 26
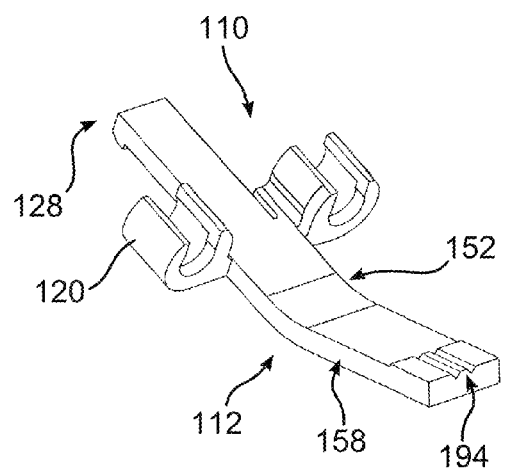
FIG. 27
FIG. 28
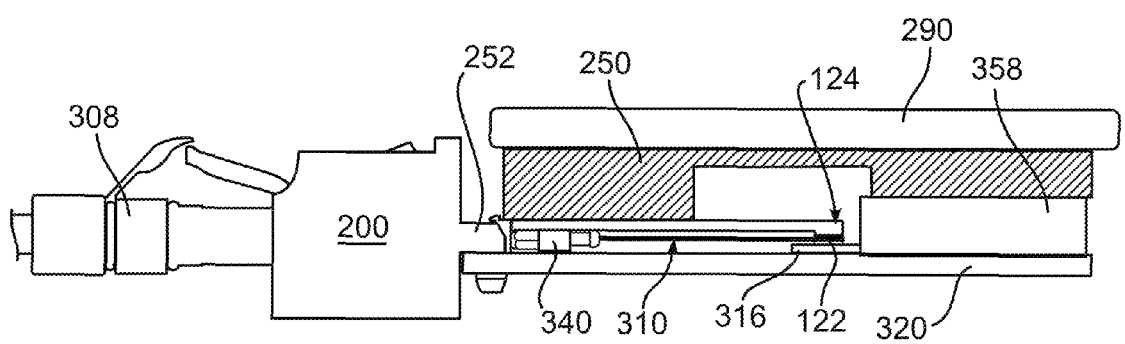

US 9,989,721 B2
CONNECTING MID-BOARD OPTICAL MODULES

FIELD OF THE DISCLOSURE

The present disclosure generally relates to connecting mid-board optical modules, and more particularly to connecting individual optical fibers, with strain relief.

BACKGROUND OF THE DISCLOSURE

Mid board optical modules (MBOs) enable moving optical I/O connections from a system faceplate directly onto a printed circuit board (PCB), enabling higher throughput and improved reliability.

There is a growing trend in the telecom, wireless, and data center markets to transition from copper to fiber optic networks to increase bandwidth and reduce power consumption. Within these fiber optic networks, optic fiber interfaces with electronic hardware at tranceivers (combined transmitters and receivers) in order to code/decode and process the signal. Currently, these electro-optic assemblies are made by using a sequential process of integration of SMT (surface mount technology) components onto a PCB with ball grid arrays or land grid arrays, and integration of optical components onto the PCB or companion structure.

SUMMARY OF THE DISCLOSURE

In an embodiment of the disclosure, a device for connecting a fiber optic cable having a connector with a cable-side ferrule to a laminate, comprises at least one fixed ferrule; a clip having a backplane, at least one retainer connected to the backplane, each of the at least one retainer sized and dimensioned to hold one of the at least one fixed ferrule in a predetermined position, and at least one clip mating attachment portion positioned upon the backplane; a cover formed with a heat conducting material, the cover including a planar portion sized and dimensioned to be positionable upon a heated component of the laminate to thereby conduct heat away from the heated component, and at least one cover mating attachment portion each mateable with one of the at least one clip mating attachment portion to secure the clip relative to the cover in a predetermined orientation relative to the laminate; and an adapter connected to the cover and including one or more alignment channels each sized and dimensioned to receive a fixed ferrule supported by one of the at least one retainer at a first end, and the cable-side ferrule at an opposite end, to thereby position the fixed ferrule and cable-side ferrule in mutual light transmitting communication.

In another embodiment of the disclosure, a device for connecting a fiber optic cable having a connector with a cable-side ferrule to a laminate, comprises a laminate; at least one fixed ferrule; a clip having a backplane, at least one retainer connected to the backplane, each of the at least one retainer sized and dimensioned to hold one of the at least one fixed ferrule in a predetermined position, and at least one clip mating attachment portion positioned upon the backplane; a cover connected to the laminate, the cover formed with a heat conducting material, the cover including a planar portion sized and dimensioned to be positionable upon a heated component of the laminate to thereby conduct heat away from the heated component, and at least one cover mating attachment portion each mateable with one of the at least one clip mating attachment portion to secure the clip relative to the cover in a predetermined orientation relative to the laminate; and an adapter connected to the cover and including one or more alignment channels each sized and dimensioned to receive a fixed ferrule supported by one of the at least one retainer at a first end, and the cable-side ferrule at an opposite end, to thereby position the fixed ferrule and cable-side ferrule in mutual light transmitting communication.

In a further embodiment of the disclosure, a method for connecting a fiber optic cable having a connector with a cable-side ferrule to a laminate, comprises connecting a cover to the laminate, the cover formed with a heat conducting material, the cover including a planar portion sized and dimensioned to be positionable upon a heated component of the laminate to thereby conduct heat away from the heated component, and at least one cover mating attachment portion; and connecting a clip to the cover, the clip having a backplane, at least one retainer connected to the backplane, each of the at least one retainer sized and dimensioned to hold a fixed ferrule in a predetermined position, and at least one clip mating attachment portion positioned upon the backplane, each clip mating attachment portion mateable with one of the at least one cover mating attachment portion to secure the clip relative to the cover in a predetermined orientation relative to the laminate; and connecting an adapter to the cover, the adapter including one or more alignment channels each sized and dimensioned to receive a fixed ferrule supported by one of the at least one retainer at a first end, and the cable-side ferrule at an opposite end, to thereby position the fixed ferrule and cable-side ferrule in mutual light transmitting communication.

BRIEF DESCRIPTION OF THE DRAWINGS

Reference may be had to the accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 1 depicts a ferrule of the prior art;

FIG. 2 depicts a system of the disclosure including a laminate, clip (not visible), and adapter of the disclosure;

FIG. 3 is a top perspective view of a ferrule holding clip of the disclosure;

FIG. 4 is a bottom perspective view of the clip of FIG. 3;

FIG. 5 is a cross section of the system of FIG. 2, taken along line A-A;

FIG. 10 is a perspective view of an alternative system of the disclosure, including a circuit board, a cutaway of a cover, and a clip (not visible) and adapter of the disclosure;

FIG. 11 is a top perspective view of an alternative clip of the disclosure, having an angular profile;

FIG. 12 is a bottom perspective view of the clip of FIG. 11

FIG. 13 is bisecting cross section of the system of FIG. 10;

FIG. 19 is a perspective view of the adapter of FIG. 2;

FIG. 20 is a wireframe view of the adapter of FIG. 19;

FIG. 21 is a perspective view of a coverplate-side end of the adapter of FIG. 2;

FIG. 22 is a perspective view of a cable side end of the adapter of FIG. 2;

FIG. 23 is a perspective view of a cable side end of a single module of an adapter of the type shown in FIG. 10;

FIG. 24 is a perspective side view showing a coverplate-side end of the adapter of FIG. 23;

FIG. 25 is a perspective side view showing a cable side end of the adapter of FIG. 23;

FIG. 26 is a perspective view of a clip of the disclosure, without an anchoring post;

FIG. 27 is a perspective view of an angled clip of the disclosure, without an anchoring post; and FIG. 28 is a cross-sectional view of a system of the disclosure.

DETAILED DESCRIPTION OF THE DISCLOSURE

Figure 6:
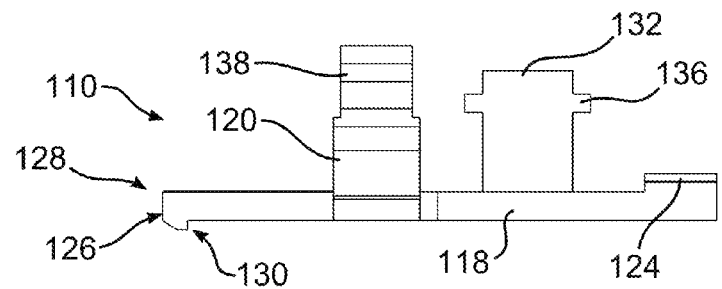
FIG. 6 is side view of the clip of FIG. 3.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

The disclosure provides for integration of a two fiber LC ferrule assembly to a silicon die on a nano-photonic silicon die. Devices of the disclosure are advantageously used for high performance servers which require parallel optics transceivers, although the disclosure is also effective for applications having lesser demands or which use a single cable or more than two cables. The examples shown in the illustration, selected for clarity, are for two fiber tranceivers for lower performance servers, broadband home routers, and fiber to the antenna solutions.

Currently, 2 port electro-optic transceivers are often used to connect a fiber optic network to an electro-optic component mounted on a laminate. A laminate is also referred to as substrate. The transceivers are designed to be mated with standard two fiber cable assemblies described in the applicable fiber channel standard, which can include duplex LCs, duplex SCs, and duplex MU connectors. Although a two fiber assembly is shown and described herein, the disclosure can be applied to SC and MU connectors having different numbers of fibers. The illustrations are for LC connectors, but the disclosure is applicable to other connector types.

With reference to the figures, and FIGS. 2, 5, 10, and 13 in particular, a two fiber LC assembly system 100 of the disclosure includes two optical fibers 310 each having cleaved ends which are positioned within and bonded into a silicon die, such as a nano-photonic silicon chip, hereinafter photonic device or die 316, which is in turn affixed on a laminate 320, in a known manner. An opposite end of each of the fibers 310, 312 is installed within a ferrule 340, in the example shown an LC ferrule in a known manner. While an LC ferrule is shown, other ferrule types can be used, such as SC and MU types, or ferrule types which are hereafter developed. Ferrules 340 are installed in an adapter 200 of the disclosure, described more particularly elsewhere herein. Adapter 200 is positioned either at a substantially straight angle and on an edge of laminate 320, as shown in FIG. 2, or adapter 200 is positioned at an angle to laminate 320, for further mounting of the laminate inboard, and not along the periphery, of circuit board 328, as shown in FIG. 10.

Figure 14:
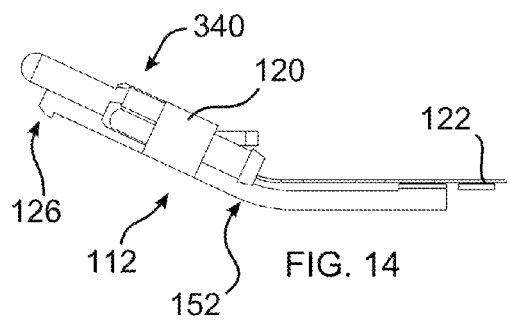
FIG. 14 is a side view of the clip of FIG. 11.
Figure 15:
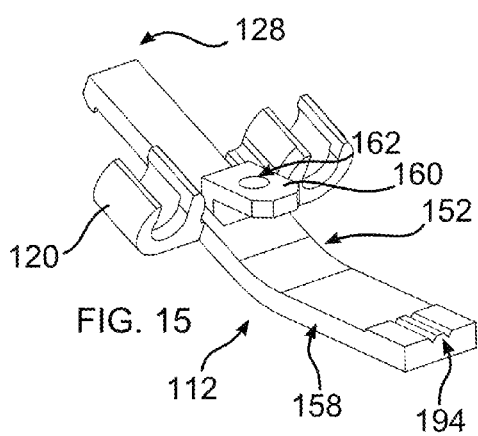
FIG. 15 is a perspective view of the clip of FIG. 11, without ferrules.
Figure 16:
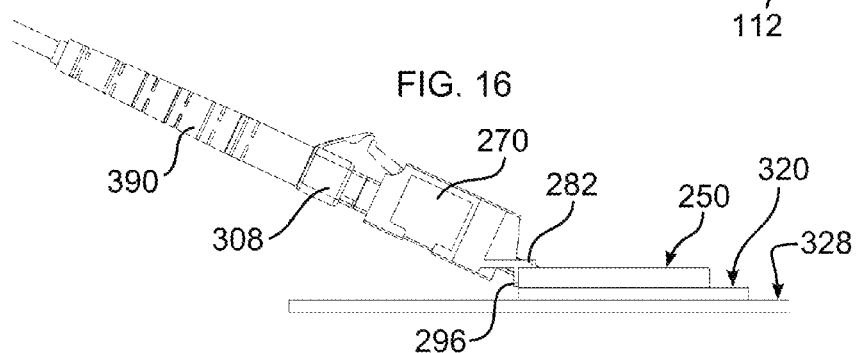
FIG. 16 is a side view of the system of FIG. 10.
Figure 17:
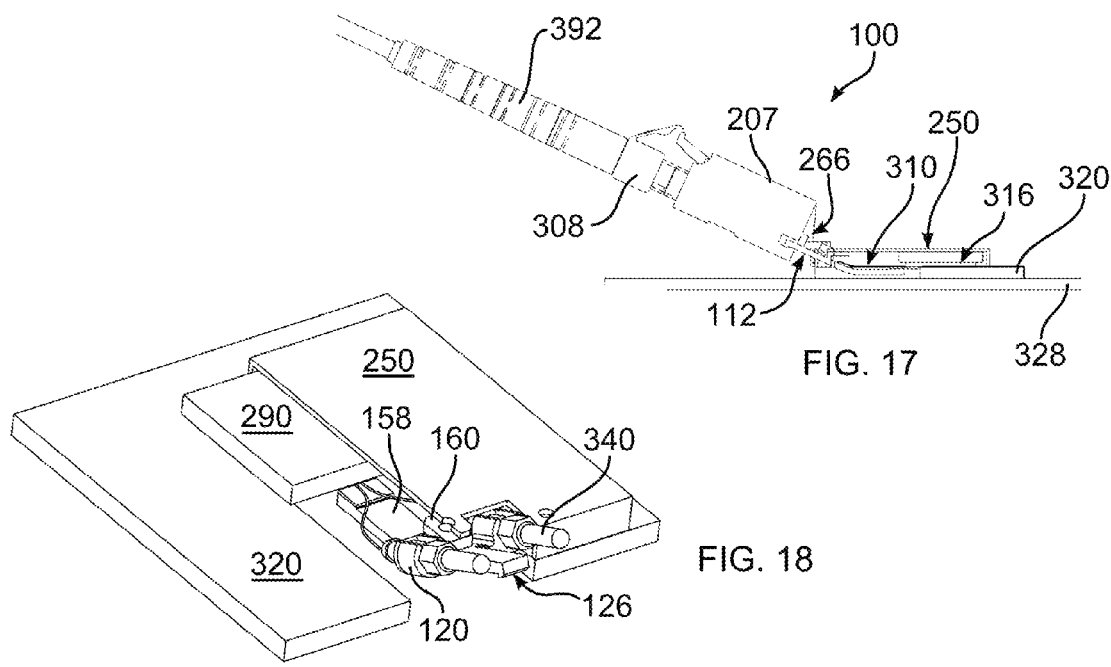
FIG. 17 is a bisecting cross section of a side view of the system of FIG. 10.
Figure 18:
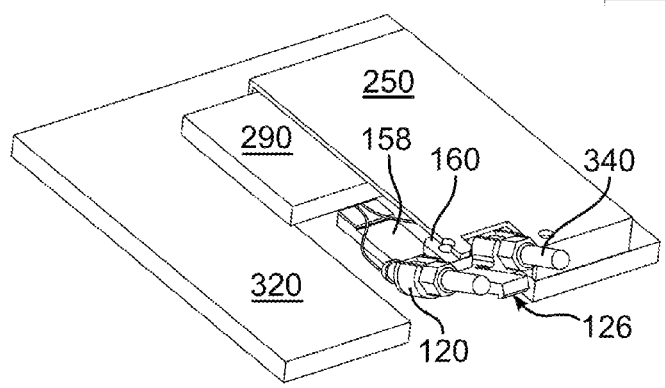
FIG. 18 is a cutaway view of the clip of FIG. 10 connected to a cover mounted to a laminate.

With reference to FIGS. 1-9, a Duplex-LC connector 308 mated to two optical cables 390, 392 is inserted into and connected to adapter 200, which is in turn optionally connected to coverplate 250. Ferrules 340 are connected to adapter 200 from the opposite side of connector 308. Fibers 310 emerging from ferrules 340 are connected to photonic die 316. Photonic die 316 is affixed to laminate 320. An alignment clip 110, shown in FIGS. 3 and 4, and in cross-section in FIG. 5, supports two ferrules 340, which are not shown within clip 110 in FIGS. 3-4 for clarity, but can be seen supported in clip 112 in FIGS. 11-12 and 14, in a similar manner to clip 110. As can be seen in FIG. 1, ferrule 340 includes a collar 342 which is matingly received within a snap-fit retainer 120 which surrounds more than 180 degrees of collar 342 when ferrule 340 is inserted into retainer 120. Clip 110 can be fabricated from plastic or other resilient material, whereby a periphery of retainer 120 can bend to admit passage of collar 342, and thereafter securely grip ferrule 340. Adhesive can be applied to collar 342 or retainer 120, particularly for high vibration environments. Ferrule 340 further includes a ring 344 that is larger than collar 342 and which can be abutted with retainer 120 to orient ferrule 340 along a longitudinal axis that passes through clip 110 from a leading clip end 128 to a trailing clip end 140. Ring 344 further prevents longitudinal movement of ferrule 340 as a connection is made.

A backplane 118 joins two retainers 120, and orients them relative to each other in a specific position, in this embodiment, particular to a two fiber LC connector. While two retainers 120 are illustrated, clip 110/112 can include only a single retainer 120, or more than two retainers 120. Retainers 120 can be connected directly to backplane 118, or they can be positioned on an arm 146 extending from opposite sides of backplane 118, extending transverse to backplane 118.

As can be seen in FIGS. 3-4, fibers 310 are each supported within a ferrule 340 at one end, and can be protected and supported at an opposite end upon one or more pads 124, disposed upon backplane 118. Pad 124 can include an adhesive material, or an adhesive material can be applied, in order to maintain a position of fibers 310. Pad 124 can include grooves or channels 194 to facilitate placement of fibers in predetermined positions. The position of the fibers relative to pad 124 is advantageously performed within close tolerances in order to promote an accurate placement of the fibers in the u- or v-groove of photonic die 316. An optional lid 122 can be placed over fibers 310, on an opposite side with respect to the pads, to further secure fibers 310 in place. Lid 122 can be UV transparent, and can be fabricated with a thermoplastic material. If a UV transparent lid 122 is used, it is advantageous for optical fibers 310 to be thermally bonded to lid 122, for example using IR selective heating or bulkheating. Fibers 310 can be placed at a typical pitch of 250 um, 500 um or 1 mm. The position of the fibers relative to the lid is advantageously performed to close tolerances in order to promote an accurate placement of the fibers in the u- or v-groove of photonic die 316.

A pick and place fixture can be used to place clip 110 into position for the cleaved fiber ends, whether or not they are bonded to lid 122, to be secured into contact with photonic die 316. When lid 122 is used, advantageous material properties include optical or IR transparency in order to support vision system placement; UV transparency in order to support the use of UV curable adhesives; high strength; tolerance compliance; and having a high melt point, for example greater than about 260 C. Examples of acceptable materials include FEP, PFA, and optically clear PEI. In a typical application, the cleaved fiber ends bonded to the UV transparent lid will be bonded to the silicon v-groove with a UV curable adhesive.

Clip 110 and Adapter 200 can be made from any of a variety of materials, however are advantageously formed with a glass reinforced plastic, for example ULTEM 2300, or glass reinforced PC/PBT. The material selected for clip 110, in particular, advantageously can withstand temperatures greater than about 260 degrees C. without excessive distortion. The CTE should be compatible with surrounding materials.

A latch 126 is formed upon a leading end 128 of backplane 118, in this embodiment including a mating edge 130, which is engageable with adapter 200 to orient backplane 118 with respect to adapter 200 with a predetermined amount of precision in order to form a proper optical connection, as described further elsewhere herein.

Clip 110 includes one or more mating attachment portions each sized and dimensioned to engage a mating attachment portion on cover 250. For example, clip 110 can include an extension, and an object secured to cover 250 can have a receiving aperture, or vice versa, so that clip 110 can be secured in a fixed orientation with respect to coverplate 250 and photonic die 316, which are in turn secured in a fixed orientation with respect to laminate 320. In an embodiment, post 132 extends from backplane 118 and is configured to enter a mating aperture 134 in protective cover 250 that is secured in position relative to laminate 320, thereby locating clip 110 relative to photonic die 316. A crossbar 136 orients post 132 to a predetermined depth within aperture 134, thereby establishing a predetermined height of clip 110 and thus a height of retainer 120 with respect to laminate 320, as well as ferrules 340, once installed therein. Post 132 can form an interference fit with aperture 134 in order to form a secure connection with cover 250. In addition, or alternatively, adhesive or a fastener can be used. Post 132 can also have the form of a latch, as shown and described with respect to latch 126, for example. Clip 110 can also attach to laminate 320 in a similar manner.

Protective cover 250 attaches to laminate 320 by any known means, including adhesive and/or fasteners, and functions to protect underlying components, and to serve as a mounting point for clip 110/112, and adapter 200/207. Cover 250 can additionally dissipate heat generated by photonic die 316, or any other component mounted to laminate 320. A heat sink 290 can be attached to one or more particular heat generating components, such as photonic die 316, and can also be attached to cover 250, to transmit heat from the heat generating components to cover 250, where the heat is released into the surrounding atmosphere, a thermoelectric cooling device, or a liquid cooling system. Cover 250 can be integrally formed with heat sink 290.

Figure 7:
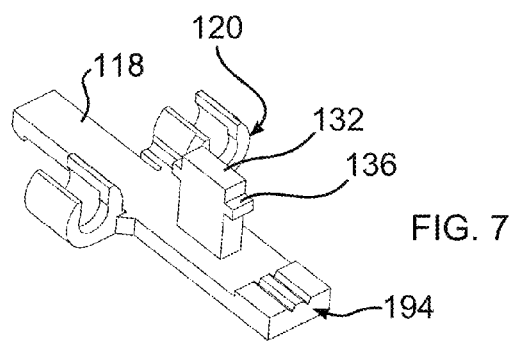
FIG. 7 is a top perspective view of an alternative clip of the disclosure.
Figure 8:
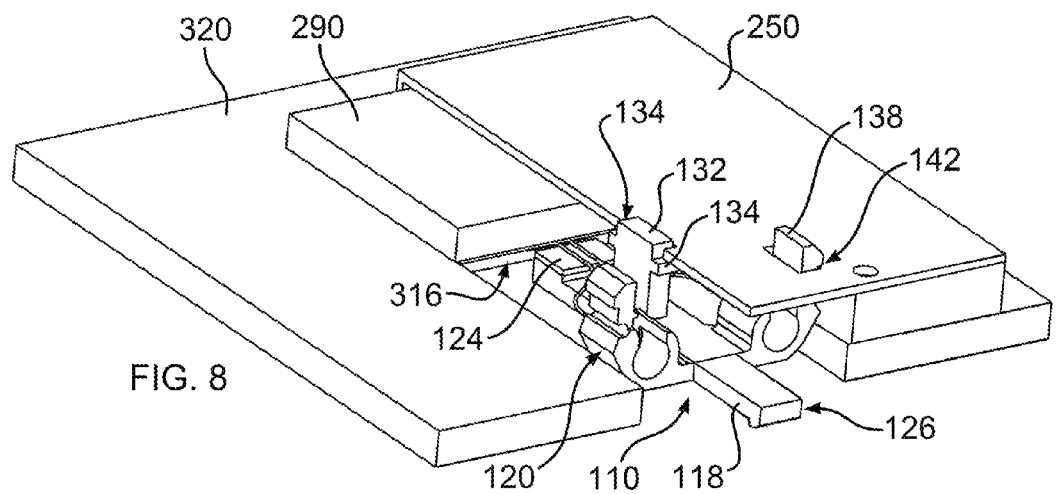
FIG. 8 is a cutaway view of the clip of FIG. 3 connected to a cover mounted to a laminate.
Figure 9:
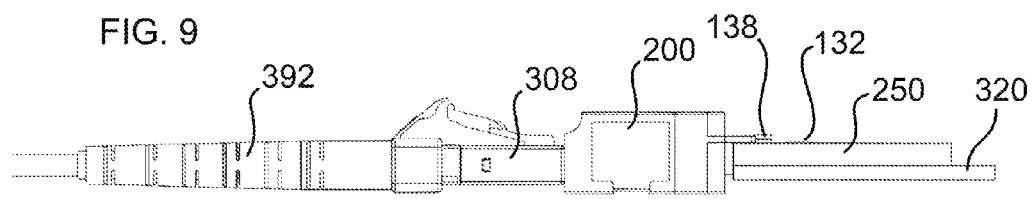
FIG. 9 is side view of the system of FIG. 2.

Additionally, one or more retainer latches 138 extend from each retainer 120, each including a mating edge 142. Latches 138 connect to cover 250, each entering an aperture 144, mating edge displacing as latch 138 is inserted into aperture 144, and resiliently springing back to an original position to engage mating edge 142 with cover 250, to thereby further orient and secure clip 110 with respect to cover 250, and in turn with respect to laminate 320. Other means of attaching clip 110 can be used, including adhesive. FIG. 7 illustrates clip 110 without latches 138, and FIG. 26 illustrates clip 110 without post 136. Additionally shown in FIGS. 7 and 26 are optional u- or v-grooves 194 for properly aligning fibers 310, which can be provided on pad 124 of any embodiment herein.

In the embodiment shown, for an LC connector, ferrule 340 can have A to B spacing between ferrule centers of 6.25 mm, which matches FOCIS-10 requirements. For example, fiber 310 can be ITU G.652 and G.657 complaint single mode fibers. In an embodiment, fibers 310 are cleaved and spaced at, for example, a 250 um, 500 um, or 1 mm pitch, although this dimension is selected to match the configuration of the silicon die/photonic die 316 V-groove (see, e.g. U.S. Patent Application 2014/0270652). For other connector types, these dimensions can be different.

In the embodiment of FIGS. 2-9, it can be seen that clip 110 orients ferrules 340 for engagement with adapter 200 at location adjacent to an edge of a printed circuit board 328. This minimizes the overall height of laminate 320, and the laminate height, in particular, and does not require a hole or gap in printed circuit board 328 for clearance. Adapter 200, additionally shown in detail in FIGS. 19-22, joins LC connector 308 to laminate 320, and transmits light from ferrules within LC connector 308 to ferrules 340 supported by clip 110, to thereby enable the transmission of data to and from cables 390, 392 to photonic die 316. Adapter 200 can be connected to laminate 320, or a component connected to laminate 320, such as cover 250, by any known means, including adhesive or fasteners. In the embodiment shown, adapter tabs 252 lie in contact with cover 250 when adapter 200 is in a proper orientation with respect to ferrules 340 held by clip 110. As can be seen in the figures, tabs 252 can be provided with mounting holes 254 through which a fastener such as a screw can be passed to connect adapter 200 to cover 250, although tabs 252 can be adhered to cover 250 or another component connected to laminate 320. Clip 110 can have a z-axis profile of, for example, an 'L' shape, or any other configuration, to accommodate off axis assembly.

In the example of FIGS. 2 and 19-22, adapter 200 has two modules 260 into which a duplex LC connector can be inserted. However, it should be understood that a greater or fewer number of modules 260 can be formed, or multiple separate adapters 200 can be placed side by side in connection with coverplate 250 or laminate 320, each adapter having a single module 260, such as is shown for an angled adapter 270 in FIGS. 23-25, described elsewhere herein.

As may be seen in FIGS. 19-24, each module 260 of either adapter 200 or adapter 270 accepts insertion of an LC connector on a connector end 262, and ferrule 340 at a board end 264. As can be seen in the wire frame model of FIG. 20, an alignment channel 266 within an interior of adapter 200 admits insertion of ferrule 340, which is fixed in a position with respect to photonic die 316, and a cable-side ferrule within the LC connector, to align the fixed and cable-side ferrules for data communication. In an embodiment, a ceramic split sleeve is installed in the alignment channel, which centralizes ferrules from both sides. Tabs 252 align adapter 200/270 with clip 110 and therefore align ferrule 340 with alignment channel 266. An interior chamber 268 within module 260 is configured to align and orient the type of connector for which adapter 220/270 is intended for use with system 100, and can include a catch structure 272 which can mate with a latch structure of the connector, including that of the LC connector.

With reference to FIG. 2, and to FIG. 5, which is a cross-section of FIG. 2 taken along line A-A, two optical cables 390, 392 are terminated in a duplex LC connector 308, the connector inserted into chambers 268, and a ferrule of the LC connector is inserted into alignment channel 266 of adapter 200/276. Clip 110 is connected to adapter 200 at latch 126, and to cover 250 at post 132. In addition, lid 122 has been positioned with respect to a u- or v-groove, or other alignment structure, of photonic die 316, thereby positioning fibers 310 with respect to photonic die 316.

In this manner, cable 392 is aligned with a ferrule within LC connector 308, the connector ferrule is aligned with ferrule 340 within adapter 200, adapter 200 is aligned with respect to cover 250 and laminate 320, clip 110 is aligned with adapter 200 and cover 250, and fibers 310 are aligned with photonic die 316, whereby light transmission and data communication can effectively take place between cables 390, 392 and photonic die 316.

Likewise, strain relief is transferred from cable 390 or 392 through the LC latch to adapter 200/207, and from adapter 200 via tab 252 or adhesive to cover 250, and via cover 250 to laminate 320, the latter typically connected to a printed circuit board that is in turn connected to a chassis. In this manner, no stress is imparted to fibers 310 from stress applied to cables 390 or 392.

It should further be understood that adapter 200/207 can be connected to laminate 320 in addition to, or in the alternative to, attachment to cover 250, using tabs, adhesive, or other method of attachment.

With reference to FIGS. 10-17, an alternative embodiment of the disclosure enables connection to an optical cable at a location not along an edge, but to an interior region of an electronic printed circuit board 328, where laminate 320 and photonic die 316 are attached. To ensure space for insertion of connector 308 among components positioned upon laminate 320, clip 112, adapter 207, and ferrules 340 are angled upwards and away from a surface of laminate 320, so that a connector 308 can be angularly inserted into adapter 200/207. Clip 112 is analogous to clip 110, however backplane 158 has a bend 152 causing leading end 128 of clip 112 to be raised, and retainers 120 to be positioned at an angle with respect to a plane defined by photonic die 316. In this manner, clip end 140 is parallel to a plane defined by the u- or v-grooves of photonic die 316, and therefore pads 124 and lid 122 function as described with respect to clip 110, however ferrules 340 are held to angle upwards and away from this plane. The angle can be chosen to avoid interference with components on laminate 320, as well as to define a curved exit path for cable 390, 392 without sharp bends. Laminate 320 serves to connect photonic die 316 to a PCB 328, and also serves for improving heat dissipation at a board-side location.

In addition to latch 126, clip 112 is attached to system 100 and held in position by clip tab 160, which includes a mounting hole 162 through which a fastener or adhesive can be passed. Clip tab 160 is oriented to be coplanar with cover 250 when clip 112 is installed, to thereby define a correct predetermined angular orientation of bend 152 and clip 112. As clip 112 is not positioned under cover 250 to the extent shown for clip 110, latches 138 are not provided.

Adapter 207 is analogous to adapter 200, however adapter tabs 282 are positioned at an angle with respect to a body of the adapter, or with respect to adapter tabs 252 of adapter 200, to thereby position adapter 207 at the same angle as ferrules 340 when adapter 207 is connected to cover 250. A guide flange 296 can be provided, at a right angle to tab 282, to abut cover 250 when installed to align and stabilize a connection between adapter 207 and cover 250. Adapter 207 is fastened to cover 250 in a like manner as adapter 200, and otherwise functions as described with respect to adapter 200.

In FIG. 26, an embodiment of clip 110 is formed as described with respect to clip 110 of FIGS. 3-4, however clip 110 of FIG. 26 does not include post 132 or latches 138. As can be seen in FIG. 28, clip 110 is fastened directly to cover 250, for example using an adhesive. Clip 112 of FIG. 27 is formed as described with respect to clip 112 of FIG. 11-12, however as in FIG. 26, the anchoring member has been removed, specifically, clip tab 160. As with the embodiment of FIG. 28, clip 112 of FIG. 27 can be adhered to cover 250, or any other part which is fixed with respect to photonic die 316.

It should be understood that while anchors 132, 138, and 160 can be absent, they can also be present in a different form than as shown herein. More particularly, each cover 250 or other part to which clip 110/112 is to be attached can have a different shape, and it should be understood that anchors 132, 138, and 160 can likewise have a particular corresponding shape. A greater or fewer number of anchors can alternatively be provided upon clip 110/112.

An alternative cover 250 shape is shown in FIG. 28, conformed to the components it is protecting. FIG. 28 additionally illustrates photonic die 316 electrically connected to a micro-electronic chip 358 through laminate 320.

The disclosure thus provides a substantially lower cost connection to a photonic die 316 than heretofore known, and provides a compact form factor. The disclosure combines the functionality of SMT, ball grid arrays, and optical components in one assembly method. The disclosure additionally interfaces with standard 2F fiber optic cable assemblies, and can be environmentally sealed for OSP applications. The disclosure further provides a low power consumption solution with a reduced number of components.

What is claimed is:

1. A device for connecting one or more fiber optic ferrules and associated optical fibers to a photonic device, the ferrule connectable to a fiber optic cable via an adapter, the device comprising:
   a clip, including:
      an elongated backplane defining first and second ends at opposite ends of a longitudinal axis of the backplane;
      at least one retainer sized and dimensioned to hold a fiber optic ferrule in a predetermined position with respect to the backplane;
      a mating engagement portion proximate the first end of the elongated backplane configured to engage the connector adapter;
   a surface positioned upon the clip at the second end, which aligns optical fiber extending from the one or more ferrules to a plane of the photonic device, for connecting the optical fiber to the photonic device.

2. The device of claim 1, the mating engagement portion including a ramped clip.

3. The device of claim 1, the surface adhered to the photonic device.

4. The device of claim 1, the surface clipped to the photonic device.

5. The device of claim 1, wherein the portion of the photonic device to which the surface is engaged is a heat conducting cover of the photonic device.

6. The device of claim 1, the surface forming a post sized and dimensioned to engage a mating aperture in the photonic device.

7. The device of claim 1, the second end of the elongated backplane including grooves for aligning the associated optical fibers of the ferrule for connection to the photonic device.

8. The device of claim 1, further including a pad connected to the second end, the associated optical fibers positionable upon the pad.

9. The device of claim 3, further including a lid positionable proximate the second end to overlie the associated optical fibers.

10. The device of claim 9, wherein the lid is UV transparent and the optical fibers are secured to the lid with a UV curable adhesive.

11. The device of claim 1, wherein the clip has a melting point greater than 260 degrees C.

12. The device of claim 1, further including an arm extending transverse to the backplane and forming two opposed ends, each end supporting at least one of the at least one retainer.

13. The device of claim 12, the arm aligning two attached ferrules for insertion into a duplex connector selected from the types LC, SC, and MU.

14. The device of claim 1, wherein the backplane is bent to form a first portion that is coplanar with a board plane defined by a mounting surface of the photonic device, and a second portion, supporting the at least one retainer, that extends away from the board plane at a non-orthogonal angle with respect to the board plane, each of the at least one retainers thereby positioned to support a fixed ferrule at a predetermined angle with respect to the board plane.

15. The device of claim 1, wherein the adapter is affixed to the photonic device.

16. The device of claim 1, wherein the adapter and the clip are affixed to a heat conducting cover of the photonic device.

17. The device of claim 1, wherein each of the retainers forms a resilient C-shape which surround a portion of a ferrule.

18. A device for connecting fiber optic ferrules and associated optical fibers to a photonic device, the ferrule connectable to a fiber optic cable via an adapter, the device comprising:
    a clip, including:
        an elongated backplane defining first and second ends at opposite ends of a longitudinal axis of the backplane;
        an arm extending transverse to the backplane and forming two opposed ends, each end having a retainer sized and dimensioned to hold a fiber optic ferrule in a predetermined position with respect to the backplane;
        a mating engagement portion at the first end of the elongated backplane configured to engage the connector adapter;
        a surface positioned upon the clip at the second end, which aligns optical fiber extending from the one or more ferrules to a plane of the photonic device, for connecting the optical fiber to the photonic device.

19. The device of claim 18, wherein the portion of the photonic device to which the surface is engaged is a heat conducting cover of the photonic device.

20. A method of connecting fiber optic ferrules and associated optical fibers to a photonic device, the ferrule connectable to a fiber optic cable via an adapter, the device comprising:
    attaching a clip to the photonic device, the clip including:
        an elongated backplane defining first and second ends at opposite ends of a longitudinal axis of the backplane;
        an arm extending transverse to the backplane and forming two opposed ends, each end having a retainer sized and dimensioned to hold a fiber optic ferrule in a predetermined position with respect to the backplane;
        a mating engagement portion at the first end of the elongated backplane configured to engage the connector adapter;
        a surface positioned upon the clip at the second end, which aligns optical fiber extending from the one or more ferrules to a plane of the photonic device, for connecting the optical fiber to the photonic device.

\* \* \* \* \*